Nov. 20, 1951     A. BUNBLASKY     2,575,996
EXPANDED SCALE ROOT MEAN SQUARE TYPE VOLTMETER
Filed Oct. 12, 1949
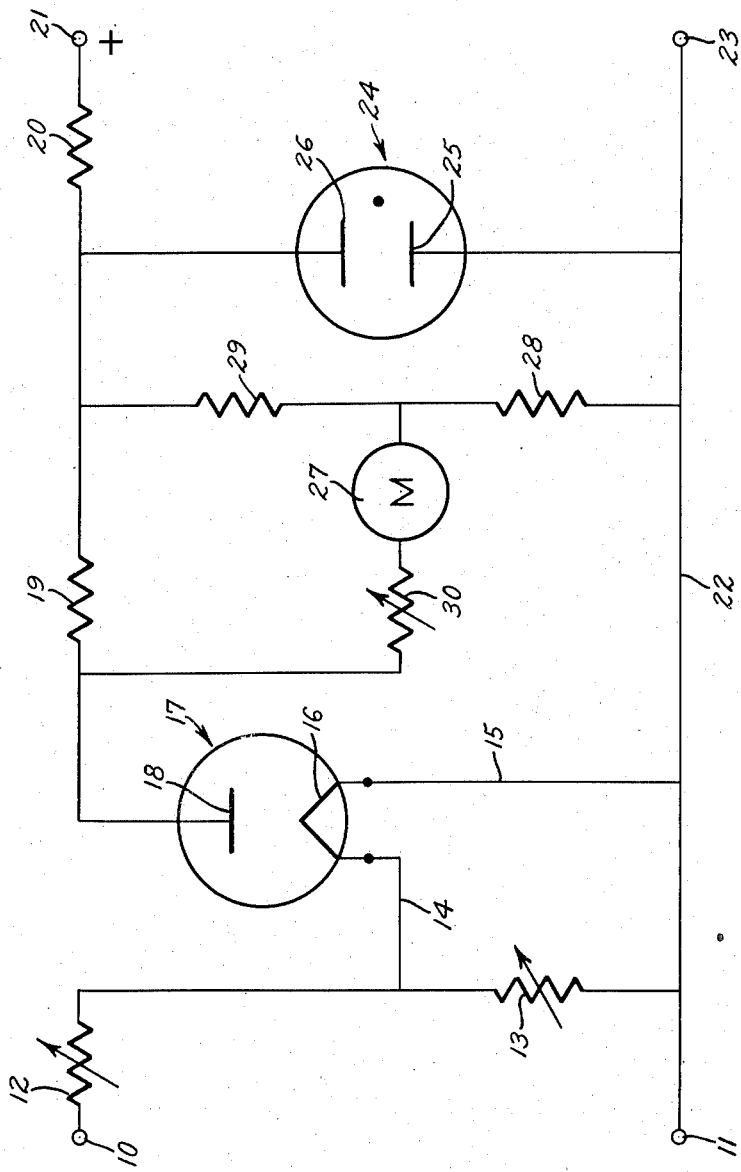
INVENTOR.
ADOLPH BUNBLASKY
BY
*John F. Hanrahan*
ATTORNEY Patented Nov. 20, 1951

2,575,996

UNITED STATES PATENT OFFICE 2,575,996

EXPANDED SCALE ROOT MEAN SQUARE TYPE VOLTMETER

Adolph Bunblasky, New Canaan, Conn., assignor to Sorensen & Company, Inc., Stamford, Conn., a corporation of Connecticut Application October 12, 1949, Serial No. 121,009

2 Claims. (Cl. 171—95)

The present invention relates to vacuum tube voltmeters and it relates more particularly to vacuum tube voltmeters adapted to indicate small changes in the effective values of an alternating current voltage.

It is an object of the invention to provide a vacuum tube voltmeter which is adapted to indicate relatively small percentage changes in the root mean square (R. M. S.) value of a voltage and yet which is non-responsive to the changes only in the peak-to-peak or average values.

Another object of the invention is to provide a vacuum tube voltmeter whereby small changes in the root mean square (R. M. S.) value of a predetermined voltage can be detected and wherein the mid-scale reading of the meter indicates the value of the predetermined voltage and the maximum and minimum readings on either side of mid-scale are relatively small percentages of the mid-scale reading.

Yet another object is to provide a vacuum tube voltmeter having the above objects and being further adapted to measure the R. M. S. changes in a wide range of predetermined voltages.

Vacuum tube voltmeters which measure the R. M. S. values of a wide range of voltages are well known but none is capable of indicating small percentage changes in the R. M. S. value of a predetermined voltage. It is evident to one skilled in the art that such a meter is highly desirable for it can be used in conjunction with control circuits or the like where it is necessary to know of any slight deviations from the normal of a predetermined voltage.

As the R. M. S. or effective voltage is a measure of the heating effect of the resulting current flow then it becomes evident that changes in the R. M. S. voltage can be measured by discerning a temperature change. In the present invention, use is made of a tungsten filament diode operated in an emission limited fashion. This means that the initial plate to filament voltage across the diode is sufficient so that virtually all of the emitted electrons are attracted to the plate. Under such conditions, the plate current flowing is a function of the filament temperature. The filament temperature is a function of the voltage across the filament and the resulting current flowing through it.

As only the change in the R. M. S. voltage is to be detected and indicated on the meter, the voltage whose change is to be so indicated is applied across the diode filament and the operation is along only a relatively small portion of the plate current vs. filament temperature characteristic. Thus, the plate current is very nearly proportional to the temperature of the diode filament. This results in the meter having a very nearly linear scale.

The invention will be more clearly understood and other objects and advantages will become apparent from the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing the figure is a schematic circuit diagram of one embodiment of the invention.

Referring now to the drawing, the input alternating current voltage is applied to input terminals 10 and 11 and is developed across the voltage divider comprising a variable resistance 12 and a variable resistance 13 connected in series. Thus, the proportion of the input voltage appearing across the resistance 13 is applied by means of connections 14 and 15 across a tungsten filament 16 of a diode vacuum tube 17. Vacuum tube 17 also has a plate 18 which is connected through a resistance 19 and a serially connected resistance 20 to a positive terminal 21 of a suitable source of potential. The junction of the voltage divides resistance 13 and connection 15 is carried by a connection 22 to a negative terminal 23 of the aforementioned potential source.

A gas filled glow tube 24 is connected across terminals 23 and 24, one terminal 25 being connected directly to negative terminal 23 and the other terminal 26 being connected through the current limiting resistance 20 to the positive terminal 21. The gas filled tube 24 serves as a voltage stabilizer which maintains the voltage between the plate 18 and filament 16 at a fixed value. This value is sufficient to insure that virtually all of the electrons emited by the filament 16 are drawn to plate 18. The plate current flowing will then fluctuate only with changes in the temperature of the tungsten filament 16. Any change in the R. M. S. value of the voltage applied across the input terminals 10 and 11 will manifest itself by a corresponding change in the plate current of the diode vacuum tube 17.

The plate current is measured by a fairly sensitive D'Arsonval type milliammeter 27. The entire plate current from vacuum tube 17 does not actually flow through the meter 27 as a Wheatstone type bridge circuit is employed in order to isolate or to predetermine the quiescent current which would flow through meter 27 due to the potential across the terminals 21 and 23.

The arms of the bridge referred to comprise the resistance 19, the diode vacuum tube 17, a resistance 28 and a resistance 29. The cross member of the bridge comprises a resistance 30 having one side connected to the junction of the resistance 19 and plate 18 of diode vacuum tube 17. The other side of resistance 30 is connected to one terminal of milliammeter 27 the other terminal of the milliammeter being connected to the junction of the resistances 28 and 29.

The potential across the glow tube 24 is thus impressed across the bridge at the junction of the resistances 19 and 29 and at the junction of the resistance 28 and the filament 16 of diode vacuum tube 17. By suitable choice of the values of the resistances 19, 28 and 29, the quiescent current flowing through the milliammeter 27 due to the presence of the potential source applied across the terminals 21 and 23 may be made equal to zero or to any predetermined value desired. Further adjustment can be achieved by choice of the value of the resistance 30.

It is deemed preferable to use a conventional milliammeter for meter 27 and a normal quiescent current would flow in order to bring the meter to mid-scale. If a zero center meter is used the bridge would be so balanced as to reduce the quiescent current to zero.

In order to further understand the invention, assume, by way of example, that it is desired to determine accurately any changes in the R. M. S. value of 100 volts. In such an instance, 100 volts R. M. S. is applied to the input terminals 10 and 11. A proportionate amount is then developed across the resistance 13 of the voltage divider and applied to the filament 16 of diode vacuum tube 17. Under such conditions the mid-scale value of meter 27 would represent 100 volts. The mid-scale calibration having been determined by the bridge arm values and by choice of resistance 30 which may be of the variable type.

Any change in the R. M. S. value of the input voltage results in change in the voltage across the filament 16 and a corresponding change in its temperature. The change in temperature causes a concomitant change in the plate current and an unbalance in the bridge circuit due to the change in the internal impedance of the diode vacuum tube. The unbalance in the bridge causes the meter to deflect from its mid-scale position. The direction of the deflection, i. e., left or right of center, depends upon whether the R. M. S. value of the input voltage decreased or increased. As the change in temperature occurs over only a relatively small portion of the plate current vs. temperature characteristic of the vacuum tube 17, the change plate current is very nearly directly proportional to the temperature change and hence voltage change. Thus the deflection scale on the meter 27 is substantially linear.

Changes in the R. M. S. value of a wide range of input voltages may be determined by choosing proper values of the voltage divider comprising the variable resistances 12 and 13. For example, it is apparent to one skilled in the art that instead of using variable type resistance a switch may be employed to select various values of resistances so as to provide a voltage divider suitable for a wide range of input voltages.

One method of operation would be to have the voltage divider so arranged, either by varying the variable resistances 12 and 13 or using a switch for choosing predetermined resistances as indicated above, so as to always apply a predetermined voltage across the filament. By way of example, if 100 volts were applied across terminals 10 and 11, 10 volts would be applied across filament 16. Should 300 volts be applied the values of resistances 12 and 13 are chosen so that 10 volts is still applied across the filament. Under such conditions, whatever the impressed voltage, that impressed across the filament is fixed. Then should the voltage applied to the terminals 10 and 11 vary, say 5%, then regardless of what the impressed voltage may be the variation of the voltage across the filament is 5% of the voltage applied thereto. As heretofore mentioned, this is a fixed value, subject, of course, to fluctuations, therefore for a given percent variation of the voltage across terminals 10 and 11 the change in the voltage across the filament 16 is fixed.

Thus, meter 27 could be calibrated simply in terms of percentages. Normal value or mid-scale reading could be zero and the readings to the left or right could be calibrated in terms of percent to show the percent above or below normal as represented by the mid-scale reading.

It is evident that the voltmeter described herein can operate equally well for alternating current voltages or direct current voltages. Under the latter application, different calibration procedures would be employed, but any changes in a predetermined value would be shown as indicated heretofore.

Having thus set forth the nature of my invention, what I claim is:

1. A voltmeter adapted to indicate relatively small percentage changes in the root mean square value of a predetermined alternating current voltage, said voltmeter including a vacuum tube having at least a plate element and a tungsten filament, variable voltage divider means for applying a predetermined portion of any one of a wide range of predetermined input voltages across said filament, a Wheatstone type bridge circuit having four arms, said arms including a first resistance, a second resistance, a third resistance all being serially connected and said vacuum tube, the plate element thereof being connected to said first resistance, the filament thereof being connected to said third resistance, means for applying a predetermined direct current voltage across the diagonal of the bridge formed by the junction of said first and second resistance and the junction of said filament and said third resistance, a milliammeter connected across the opposite diagonal of said bridge, and means for calibrating said milliammeter to indicate small changes in the root mean square value of said predetermined input voltage whereby the quiescent current through said milliammeter is predeterminable to maintain the meter at mid-scale when the predetermined portion of the predetermined input voltage is impressed across said filament and changes in the effective value of said input voltage results in a change in the plate current in said vacuum tube, a resultant unbalance in said bridge circuit, and an indication on said milliammeter, either side of mid-scale, proportional to the change in said plate current and resultant indication of the change in the effective value of said input.

2. A differential voltmeter adapted to indicate relatively small percentage changes in the root mean square value of a predetermined alternating current voltage, said voltmeter including a bridge circuit having as an arm thereof a vacuum tube including a plate and a filament, variable voltage divider means for applying a predetermined portion of any one of a wide range of predetermined input voltages across said filament, means for applying a predetermined direct current voltage across a diagonal of said bridge, a meter across the other diagonal of said bridge, and a variable resistance in series with said meter for calibrating said meter whereby the quiescent current through said meter is predeterminable to maintain the meter at a predetermined reading when the predetermined portion of the predetermined input voltage is impressed across said filament and changes in the effective value of said input voltage results in a change in the plate current in said vacuum tube, a resultant unbalance in said bridge circuit and an indication on said meter proportional to the change in said plate current.

ADOLPH BUNBLASKY.

REFERENCES CITED

The following references are of record in the file of this patent:

UNITED STATES PATENTS

| Number | Name | Date |
| --- | --- | --- |
| 2,329,073 | Mitchell | Sept. 7, 1943 |
| 2,374,248 | Tuttle | Apr. 24, 1945 |
| 2,439,072 | Bussey | Apr. 6, 1948 |

FOREIGN PATENTS

| Number | Country | Date |
| --- | --- | --- |
| 550,866 | Germany | May 31, 1932 |
| 545,999 | Great Britain | June 23, 1942 |